…

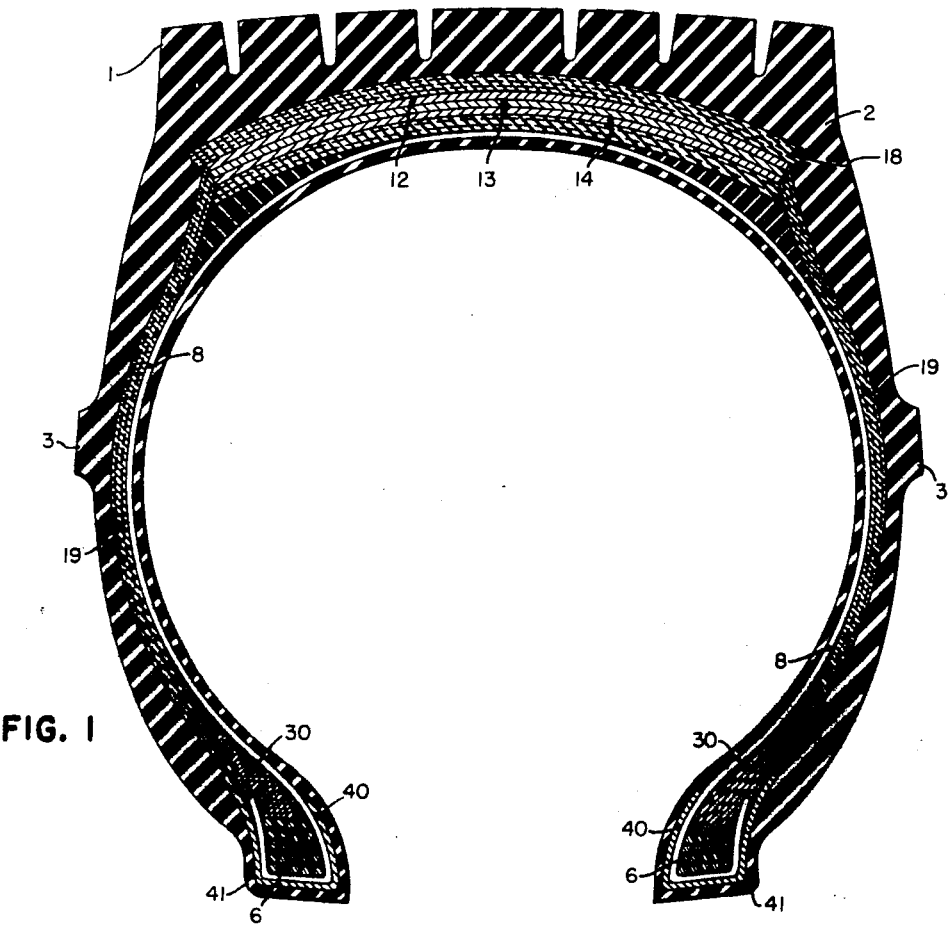
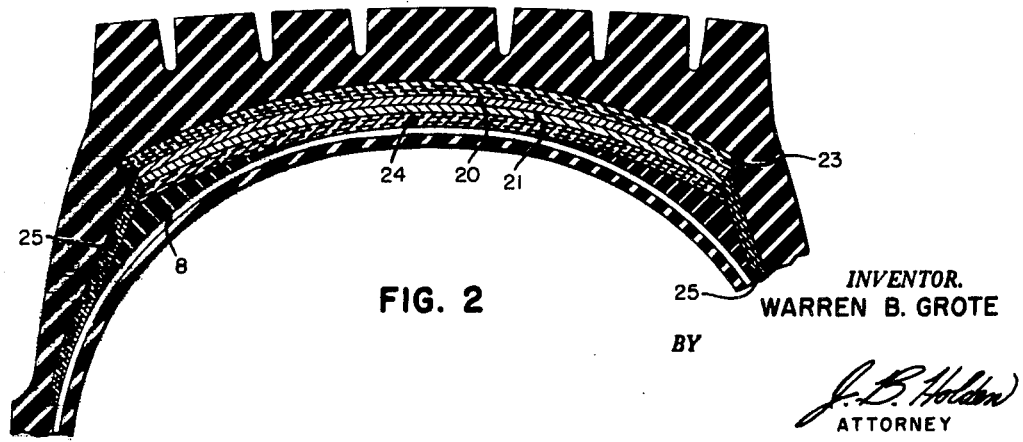

United States Patent Office 3,050,098
Patented Aug. 21, 1962

3,050,098
TIRE WITH SIDEWALL INSERTS
Warren B. Grote, Silver Lake, Ohio, assignor to The Goodyear Tire & Rubber Company, Akron, Ohio, a corporation of Ohio
Filed June 28, 1961, Ser. No. 120,355
15 Claims. (Cl. 152—354)

This invention relates to an on-the-road or an on-and-off-the-road pneumatic tire (the latter being a usual name for a tire adapted for use at times on the road and at other times off the road). The tire is formed from one or more radial cord plies. It is of belted construction. The radial plies are preferably, but not necessarily of wire. The breaker includes at least two plies of metallic wire cords extending at opposite acute angles to the center-line of the tread.

In addition to this preferred radial-ply tire construction, the invention includes a new apex structure applicable to tires of any construction for any use, and a "chipper" for use in radial-ply tires.

The radial-ply construction has various advantages. The flexing of a tire of this construction in use does not generate as much heat as is generated by the conventional tire with crossed cords in adjacent plies; and the resultant lower running temperature is recognized as advantageous because less deterioration occurs at low temperatures. A chief disadvantage of the radial-ply construction, particularly a tire with only one radial ply, is the ease with which the tire can be bruised or cut, especially in the sidewall area (i.e. the area between the tread shoulder and the bead); also the sidewall rubber tends to crack and is easily damaged by curbing.

In order to protect the tread, a breaker is used which in the preferred tire of this invention is composed of two bias wire plies. The wires in these respective wire plies lie at opposite angles to the centerline of the tire tread. The breaker may include other protective material.

The undertread of the tire, i.e. the rubber stock between the breaker and the tread, may be of any usual structure, or this portion of the tire may be reinforced by short lengths of filamentary material dispersed in the rubber. Also, between the breaker and the radial cord ply or plies the tire may be of any usual construction, but is preferably reinforced by short lengths of filamentary material. In the preferred tire of this invention, bordering the general breaker area, on each side, and possibly integral with one of said plies which contains filamentary material, are sidewall inserts which contain short lengths of filamentary material. Preferably these inserts are calendered, and they may be separate from the other plies containing filamentary material.

If the sidewall inserts are integral with the other stock containing filamentary material, it is difficult to shape the tire by conventional methods, particularly if short wire lengths are used, as the filamentary material. Thus the undertread or ply between the breaker and radial ply or plies is generally fabricated as a unit containing short lengths of wire or other filamentary material, and the sidewall inserts are separately calendered from stock containing short lengths of wire or other filamentary material.

The flexing of radial-ply tires in use, stretches and compresses the rubber between the individual ply wires at each revolution of the tire, and this eventually results in fatigue-type cracking in the rubber of the tire, particularly in the sidewall area. The sidewall inserts reduce or prevent such cracking, and tend to localize it on the tire sidewall surface. If these cracks do not penetrate the tire but are localized at the tire surface, the tire can be repeatedly retreaded and the localized surface cracks easily repaired. If the filamentary material is metallic, the inserts help dissipate heat generated by constant flexing of the tire in use. The inserts regardless of the filamentary material they contain reduce the growth of cracks initiated in any manner, by preventing separation or damage to the major components of the tire. The sidewall inserts may be confined to the upper sidewall of the tire, or they may extend substantially to the beads, or may terminate at any location between the two.

The filamentary material used in the sidewall inserts is preferably short lengths of wire, although short lengths of textile material such as cotton cords, cotton yarns, rayon filament or flock, nylon filament or flock, polyester filament or flock, vinyl cords or strips, etc. may be used. If wire, it is preferably a very small gauge steel wire preferably but not necessarily coated with brass to cause the rubber to bond to it on vulcanization of the tire.

When rubber stock containing short lengths of filamentary material is milled or calendered or tubed, the filamentary material tends to align or orientate itself in the direction of the flow of the stock. The amount of orientation depends upon the length and stiffness, etc. of the filamentary material.

The lengths of filamentary material usually measure from about 1/8 inch to 1½ inches in length, although they may be somewhat longer. The amount of the short filaments employed may vary. If wire, the amount may vary from, for example, about 10 percent up to 40 percent (by weight) of the total weight of compound used in the insert; and if other filamentary material is employed, about the same volume will be used as is represented by 10 to 40 percent by weight of wire.

The best results were obtained with short lengths of wire about 0.0058" gauge, ½ to 5/8 inch long. Wires up to about 0.015 gauge can be used. The preferred amount is about 3.65 percent, by volume. Good results were obtained with as little as 1.5 percent by volume, and with as much as 7.3 percent by volume. Wire lengths ¼ inch long were satisfactory, but these tend to remain relatively unaligned during milling and subsequent calendering. The stock may be tubed instead of being calendered. Longer pieces of wire tended to be twisted and crinkled during milling and were not straightened out appreciably on subsequent calendering.

Good results were obtained also with short lengths of nylon yarn, chopped nylon cord and with nylon flock. Chopped 840/2 nylon cord was preferred. Pieces about ½ inch long were preferred, although pieces measuring 1 inch and more can be used. The best concentration was about 5 percent by volume, but up to 7½ percent or even more can be used.

Reclaimed tire cord fabric, being a mixture of rayon, nylon and cotton, about ¼ inch long gave satisfactory results in a concentration of 7½ percent by volume. Higher concentrations up to 12 percent, for example, can be used.

Such short lengths of filamentary material are satisfactory in the sidewall inserts and can be used also in the undertread and between the breaker and the cord ply or plies.

The invention will be further described in connection with the accompanying drawings, in which—

FIG. 1 is a section through a tire constructed according to this invention; and

FIG. 2 is a section through a tread portion of a tire down to the portion of the sidewall which is subjected to the greatest flexing, showing a modified construction.

The tire of FIGURE 1 is composed of a rubber tread 1, with shoulders 2 and sidewalls 3 which extend from the shoulders to the bead portions 4. The drawing shows a single radial ply 8, the ends of which are wrapped around the beads 6 and anchored to same.

There are three breakers 12, 13 and 14, each composed of metal wire cords. In two of these breaker plies such as the plies 12 and 13, the wires are at opposite acute angles to the centerline of the tire, with all of the wires in each breaker ply parallel to one another. In the first breaker, which may be the ply 14 (or it may be the outer ply or an intermediate ply), the wires may extend radially from one side of the tire to the other, parallel to the radial cords within the radial ply or they may be on the bias, and, for example, form an angle of 70 degrees with the centerline of the tread. Between the outer breaker 12 and the tread surface 1 of the tire is the undertread 18 which may be of ordinary tread stock but preferably contains filamentary material, as described. This filamentary material may also be placed between the first breaker 14 and the carcass ply 8 or between any or between all breaker plies.

This filamentary material resists cracking due to flexing of the radial cords, particularly if it is orientated circumferentially of the tire, or even if it is unorientated.

On milling and calendering, the short lengths of filamentary material in the sidewall inserts 19 tend to be orientated in the rubber stock in the direction in which the stock is milled or calendered. The best strength results are obtained by sheeting out the sidewall inserts with the filamentary material orientated circumferentially However, radial alignment materially helps to prevent cracks occurring due to the flexing of the radial cords as the tire rotates and lends itself more readily to the processing of the tire before vulcanization. Such alignment is more adaptable to the flexing conditions unique to the radial ply construction in service.

Short wire cords give much better resistance to penetration and cracking than filaments of organic material, and in other ways are superior in the sidewall inserts 19 and in the undertread 18. If the wire lengths are very short (⅓ inch length) they can be orientated to some extent, but usually they will have a random arrangement in the rubber stock. In every respect such a tire is commercially satisfactory. It has prolonged life due to prevention of cuts and bruises, and has a low running temperature. It can be retreaded repeatedly.

In FIGURE 2 the construction is modified by providing only two wire breakers 20 and 21 with the wires in each parallel to one another, and the breakers are opposed to one another at an acute angle to the centerline of the tire. The outermost breaker 23 is a reinforcing rubber ply with short lengths of filamentary material therein, such as described, preferably short wire lengths. Radial orientation of the filamentary material is preferred, especially if the ply containing the filamentary material is located at 24 between the carcass ply 8 and the first breaker 14. However, orientation in any direction adds strength in that direction and has proved beneficial. It is well known that if a tire tread becomes cut or cracked so that water seeps into a wire breaker, irreparable damage may result due to rusting. Rusting of the short wire lengths is not so detrimental, and the rubber containing the filamentary material may contain shallow cuts and cracks without doing damage to the major parts of the tire.

FIGURE 2 indicates that it is not necessary for the sidewall inserts 25 to extend to the beads. They need not extend below the middle of the sidewall. They preferably closely approach the breaker edges to provide continuous protection across the tread and inwardly therefrom down the sidewalls of the tires. The ply containing filamentary material may be located at 18, as in FIGURE 1, or at 24, or at both places or in neither place. In any ply of filamentary material located between the radial ply 8 and the inner breaker, the filamentary material is advantageously orientated radially of the tire, i.e. from bead to bead, or at an acute angle to the bead-to-bead cords in the carcass.

In constructing a tire, the sidewall inserts are generally located while the tire is on the drum. The breaker is incorporated in the tire after it has been expanded to its approximate vulcanized shape.

FIGURE 1 illustrates an improvement applicable to all pneumatic tires. The plies, etc. which bound the generally triangular apex 30 tend to separate from the apex. If short lengths of wire, as described, are milled into the apex rubber stock, the ends of these short lengths protrude from the rubber stock and penetrate the adjoining material whether it be a rubber composition or fabric coated with rubber. By penetrating the adjoining stock, and then being vulcanized, a stronger bond is formed than with rubber stock that does not contain short wire lengths. If more than one apex is used at a bead, they may all contain short wire lengths, or the short wire lengths can be localized where they are most effective in forming a bond with the adjacent material. The short wire lengths may be of the size above described and used in the amount there stated as preferred, although the amount used may be varied outside the range required in sidewall inserts.

The invention also includes a so-called "chipper" 40 at the bead. This includes short lengths of filamentary material, preferably short lengths of wire. Usually, a tire includes a flipper in which the wires of the tire bead are enclosed. Usually also, a tire includes a chafer strip. In the tire of FIGURE 1 there is no chafer strip or flipper strip, but chipper 40 is used instead. Fabric chipper strips are known. The chipper 40 which is rubber stock compounded with filamentary material replaces the fabric chipper or can be used in conjunction with it. It is on the outside of the radial ply 8 and extends from a location in the outer surface of the tire at about the top of the rim flange to about the same level in the inside of the tire. It prevents abrasion of the outer rubber surface 41, which if it were worn away would expose the radial cords of the ply 8 whether they be wire, rayon, or of other composition. If the rubber 41 is removed by rubbing against the rim, and the chipper 40 is thereby exposed, the chipper will resist abrasion and protect the ply 8. If the tire be a tubeless tire, the chipper will form an air-tight seal with the rim wherever the rubber 41 has been worn away.

The chipper may contain filamentary material of any of the mentioned compositions and sizes. The amount used need not come within the range recommended for sidewall inserts.

The invention is covered in the claims which follow.

What I claim is:

1. A pneumatic tire comprising a carcass having a rubber tread, shoulders, sidewalls and bead portions, a bead ring in each of said bead portions, at least one radial ply with the cords thereof extending radially from bead to bead, at least two breakers of parallel metallic wire cords, the cords in the respective breakers extending at opposite acute angles to the centerline of the tread, and a sidewall insert at each side of the tire each of which extends from a location adjacent an end of the breaker to at least about the middle of the sidewall, each of said inserts comprising short lengths of filamentary material which increase its cut, crack, and abrasion resistance.

2. The tire of claim 1 in which there is only one cord ply extending radially from one bead to the other, and this is composed of parallel wires.

3. The tire of claim 1 in which the filamentary material in the sidewall inserts is at least largely short lengths of wire.

4. The tire of claim 1 in which the sidewall inserts extend into the bead portion of the tire.

5. The tire of claim 4 in which the filamentary material in the sidewall inserts is orientated generally radially of the tire.

6. The pneumatic tire of claim 1 in which the filamentary material in the sidewall inserts is brass-coated steel wire.

7. The pneumatic tire of claim 1 in which between the tread and said breakers there is a layer of rubber stock containing short lengths of filamentary material.

8. The pneumatic tire of claim 7 in which the filamentary material is orientated generally circumferentially of the tire.

9. The pneumatic tire of claim 7 in which the filamentary material is wire.

10. The pneumatic tire of claim 1 in which between said breaker and radial cord ply there is a layer of rubber stock containing short lengths of filamentary material.

11. The pneumatic tire of claim 10 in which the filamentary material is orientated generally parallel to said radial ply.

12. The pneumatic tire of claim 11 in which the filamentary material is wire.

13. The pneumatic tire of claim 1 in which there is a third wire breaker.

14. The tire of claim 1 in which there is an apex adjacent each bead, each apex comprising rubber and short wire lengths distributed therein.

15. The tire of claim 1 in which there is a chipper in the bead portion, outside of the radial ply and extending under the bead from a location above the bead in the outside of the tire to a location above the bead in the inside of the tire, said chipper being composed of rubber and short lengths of filamentary material.

References Cited in the file of this patent

UNITED STATES PATENTS 2,937,684    Rockoff _____ May 24, 1960

FOREIGN PATENTS

662    Great Britain _____ of 1910